United States Patent [19]
Okanoue et al.

[11] Patent Number: 5,701,333
[45] Date of Patent: Dec. 23, 1997

[54] DIVERSITY RECEIVER IN WHICH RECEPTION CHARACTERISTICS CAN BE IMPROVED

[75] Inventors: Kazuhiro Okanoue; Akihisa Ushirokawa, both of Tokyo, Japan

[73] Assignee: NEC Corporation, Japan

[21] Appl. No.: 567,669

[22] Filed: Dec. 5, 1995

[30] Foreign Application Priority Data

Dec. 5, 1994 [JP] Japan .................................. 6-300574

[51] Int. Cl.[6] ...................................... H04B 7/10
[52] U.S. Cl. ................... 375/347; 375/348; 375/349; 375/354; 375/341
[58] Field of Search ...................... 375/262, 267, 375/299, 341, 346, 347, 348, 349, 354; 371/43, 46

[56] References Cited

U.S. PATENT DOCUMENTS

| | | | |
|---|---|---|---|
| 5,481,572 | 1/1996 | Skold et al. | 375/347 |
| 5,499,272 | 3/1996 | Bottomley | 375/347 |
| 5,537,443 | 7/1996 | Yoshino et al. | 375/340 |

FOREIGN PATENT DOCUMENTS

| | | |
|---|---|---|
| 0449327 | 10/1991 | European Pat. Off. . |
| 0544315 | 6/1993 | European Pat. Off. . |
| 0604209 | 6/1994 | European Pat. Off. . |
| 3-293827 | 12/1991 | Japan . |
| 5-152975 | 6/1993 | Japan . |

OTHER PUBLICATIONS

Okanoue, Kazuhiro, et al., "New MLSE Receiver Free from Sample Timing and Input Level Controls", 1993 43rd IEEE Vehicular Technology Conference May 18–20, 1993, pp. 408–411.
Proakis, John G., Digital Communications, (McGraw–Hill 1983), pp. 394–413.

*Primary Examiner*—Stephen Chin
*Assistant Examiner*—Amanda T. Le
*Attorney, Agent, or Firm*—Ostrolenk, Faber, Gerb & Soffen, LLP

[57] ABSTRACT

In a diversity receiver provided with diversity branches (51 and 52) which have a predetermined distance therebetween and each of which produces a received signal sequence in response to reception of a radio signal directed to the diversity receiver with a symbol rate, each of samplers (56 and 57) samples the received signal sequence with plural times of the symbol rate to produce a sampled serial signal sequence. Each of serial-to-conversion circuits (58 and 59) converts the sampled serial signal sequence into parallel signals. With reference to the parallel signals, channel impulse response estimation circuits (61 and 62, or 63 and 64) estimate channel impulse responses, respectively. In accordance with each of the estimated impulse response signals and each of the parallel signals, branch metric calculation circuits (66, 67, 68, and 69) calculate branch metrics. A branch metric combining circuit (71) combines the branch metrics into a combined branch metric. A Viterbi processor (72) carries out maximum likelihood sequence estimation in accordance with the combined branch metric.

12 Claims, 8 Drawing Sheets

DIVERSITY RECEIVER IN WHICH RECEPTION CHARACTERISTICS CAN BE IMPROVED

BACKGROUND OF THE INVENTION

This invention relates to a diversity receiver comprising a maximum likelihood sequence estimator.

In order to demodulate a signal received through a communication path in which intersymbol interference is caused to occur, it is favourable to use a diversity receiver comprising a maximum likelihood sequence estimator. Such a diversity receiver is disclosed in Japanese Unexamined Patent Publication No. 283827/1991 (Japanese Patent Application No. 83479 of 1990 previously filed on Mar. 30, 1990 by Kazuhiro Okanoue alone, one of the present applicants). In the diversity receiver, the maximum likelihood sequence estimator is supplied with a signal sampled at a rate equal to a symbol rate known in the art.

However, the diversity receiver has a disadvantage in which a reception characteristic widely differs in dependence upon sample timing and which is described by Kazuhiro Okanoue, Akihisa Ushirokawa, Hideho Tomita, and Yukitsuna Furuya in 1993 43rd IEEE Vehicular Technology Conference, pages 408–411, under the title of "New MLSE Receiver Free from Sample Timing and Input Level Controls".

In order to solve the disadvantage, proposal is made of a diversity receiver having a maximum likelihood sequence estimator which is supplied with a signal sampled at a rate higher than a symbol rate. Such a diversity receiver is disclosed in Japanese Unexamined Patent Publication No. 152975/1993 (Japanese Patent Application No. 312244 of 1991 previously filed on Nov. 27, 1991 by Kazuhiro Okanoue et al).

The diversity receiver suppresses deterioration dependent upon the sampling time. However, reception characteristics can not be improved against fading which makes the reception level drop down.

SUMMARY OF THE INVENTION

It is therefore an object of the present invention to provide a diversity receiver in which reception characteristics can be improved being without influenced by fading.

It is another object of the invention to provide a diversity receiver of the type described, in which it is possible to efficiently equalize a distortion resulting from intersymbol interference occurring in a communication path without precise sample timing control.

Other objects of this invention will become clear as the description proceeds.

According to an aspect of this invention, there is provided a diversity receiver for receiving a radio signal to produce a receiver output. The radio signal is transmitted at a predetermined symbol rate. The diversity receiver comprises a plurality of diversity branches having a predetermined distance therebetween, each of the diversity branches producing a received signal sequence in response to reception of the radio signal, a plurality of branch metric producing circuits connected to the diversity branches, respectively, for producing a plurality of branch metrics by the use of the received signal sequence, a branch metric combining circuit connected to the branch metric producing circuits for combining the branch metrics to one another to produce a combined branch metric, and a Viterbi processor connected to the branch metric combining circuit for carrying out maximum likelihood sequence estimation in accordance with the combined branch metric to produce a decision signal as the receiver output. In the diversity receiver, each of the branch metric producing circuits comprises a sampler connected to one of the diversity branches for sampling the received signal sequence with plural times of the symbol rate to produce a sampled serial signal sequence, a serial-to-parallel conversion circuit connected to the sampler for converting the sampled serial signal sequence into a plurality of parallel signals, a plurality of channel impulse response estimation circuits connected to the serial-to-parallel conversion circuit for estimating channel impulse responses with reference to the parallel signals to produce a plurality of estimated impulse response signals, and a plurality of branch metric calculation circuits connected to the channel impulse response estimation circuits, respectively, and to the serial-to-parallel conversion circuits each for calculating each of the branch metrics in accordance with each of the estimated impulse response signals and with each of the parallel signals to supply each of the branch metrics to the branch metric combining circuit.

According to another aspect of this invention, there is provided a diversity receiver comprising a Viterbi processor for carrying out maximum likelihood sequence estimation to produce a decision signal, diversity branches, K in number, each for receiving a radio signal to produce a received signal sequence, where K is a positive integer not smaller than two, pulse producing means for producing pulses having a particular rate equal to N times a symbol rate relating to the radio signal, where N is a positive integer not smaller than two, samplers, K in number, connected to the diversity branches, respectively, and to the pulse producing means, each of the samplers being for sampling the received signal sequence in accordance with the pulses to produce a sampled serial signal sequence, serial-to-parallel conversion circuits, K in number, connected to the samplers, respectively, each of the serial-to-parallel conversion circuits being for converting the sampled serial signal sequence into parallel signals, N in number, channel impulse response estimation circuits, (N×K) in number, N in number of the channel impulse response estimation circuits being connected to each of the serial-to-parallel conversion circuits, the channel impulse response estimation circuits being for estimating channel impulse responses with reference to the parallel signals and to the decision signal to produce estimated impulse response signals, branch metric calculation circuits, (N×K) in number, connected to the channel impulse response estimation circuits and the serial-to-parallel conversion circuits, respectively, N in number of the channel impulse response estimation circuits being connected to each of the serial-to-parallel conversion circuits, the branch metric calculation circuits being for calculating branch metric in accordance with the estimated impulse response signals and the parallel signals to produce branch metric signals each of which is representative of the branch metric, and a branch metric combining circuit connected to the branch metric calculation circuits for combining the branch metric signals to produce a combined branch metric. In the diversity receiver, the Viterbi processor is connected to the branch metric combining circuit and carries out the maximum likelihood sequence estimation in accordance with the combined branch metric to produce the decision signal.

DESCRIPTION OF THE PREFERRED EMBODIMENTS

Figure 1:
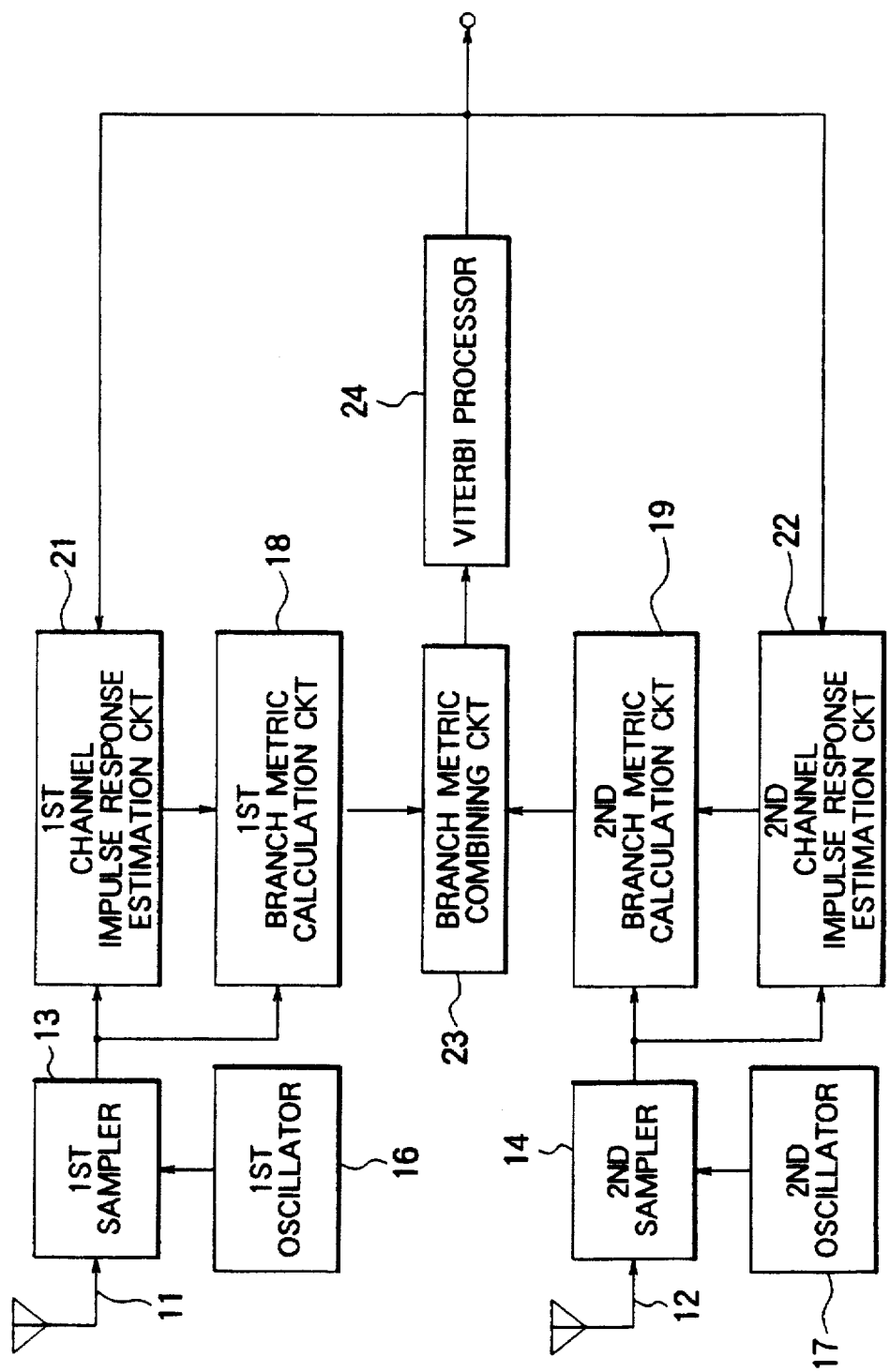
FIG. 1 is a block diagram showing a first conventional diversity receiver.

Referring to FIG. 1, description will be made at first as regards a first conventional diversity receiver for a better understanding of this invention.

In the first conventional diversity receiver, a radio signal is received as a first and a second received signal sequence by first and second diversity branches 11 and 12 which are placed with a distance therebetween. The first and the second received signal sequences are supplied as input signals to first and second samplers 13 and 14. The first and the second samplers 13 and 14 are for sampling the input signals with reference to pulses which are produced in first and second oscillators 16 and 17 to have a predetermined symbol rate. Therefore, the input signals are sampled at sample rates equal to the symbol rate. As a result, a first and a second sampled serial signal sequence are produced in the first and the second samplers 13 and 14, respectively.

The first and the second sampled serial signal sequences are supplied to first and second branch metric calculation circuits 18 and 19 and to first and second channel impulse response estimation circuits 21 and 22, respectively. Supplied with the first and the second sampled serial signal sequences, the first and the second channel impulse response estimation circuits 21 and 22 estimate channel impulse responses for the input signals to produce a first and a second estimation results which are supplied to the first and the second branch metric calculation circuits 18 and 19, respectively. The first and the second branch metric calculation circuits 18 and 19 calculate a first and a second branch metric with reference to the first and the second sampled serial signal sequences and to the first and the second estimation results to supply the first and the second branch metrics to a branch metric combining circuit 23. The branch metric combining circuit 23 combines the first and the second branch metrics to each other to produce a combined branch metric which is supplied to a Viterbi processor 24.

In the first conventional diversity receiver, use is made of the first and the second sampled serial signal sequences that are sampled at the symbol rate. Accordingly, deterioration of characteristics is inevitable in dependence upon the sample timing.

Figure 2:
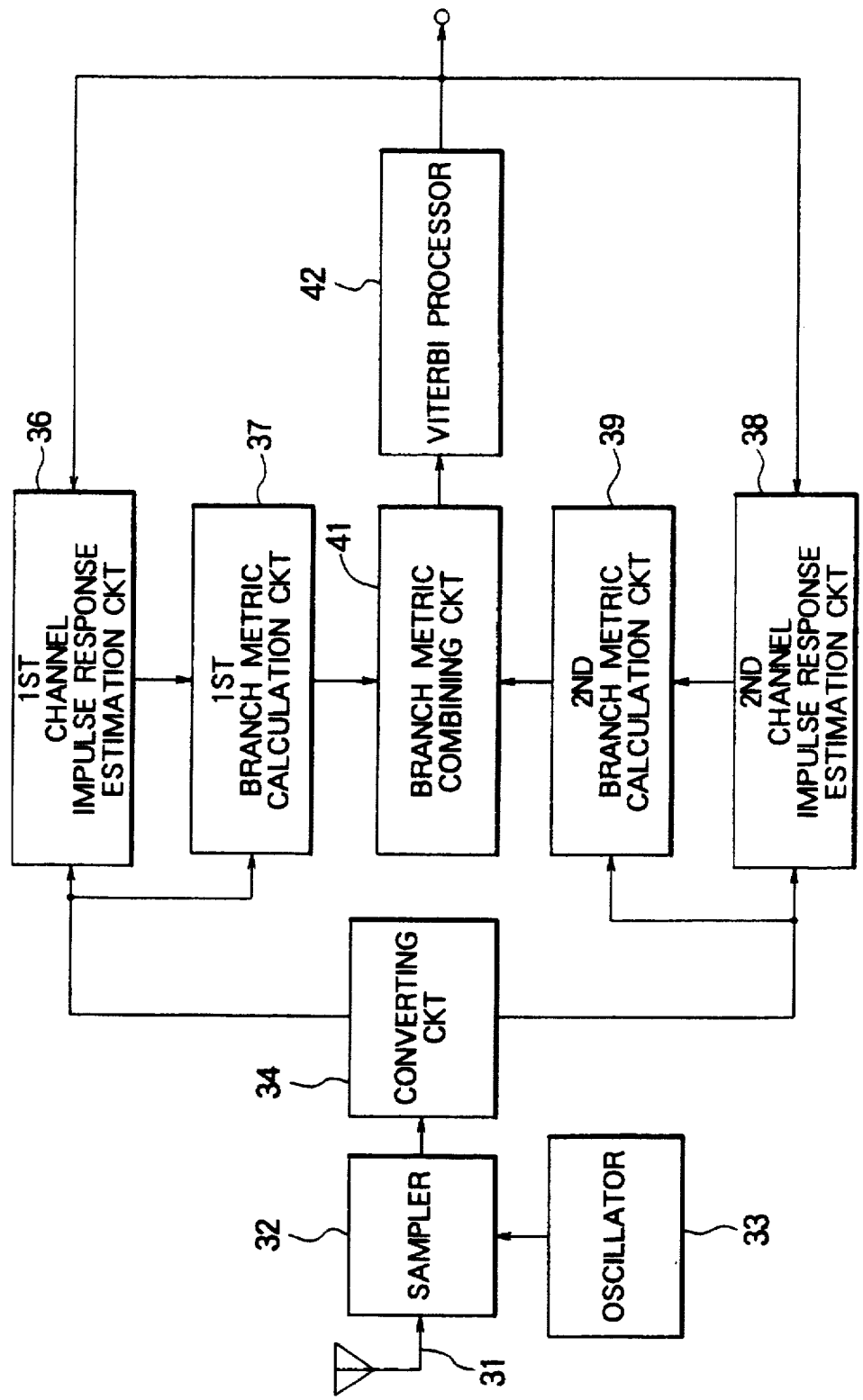
FIG. 2 is a block diagram showing a second conventional diversity receiver.

Turning to FIG. 2, the description will be directed to a second conventional diversity receiver.

In the second conventional diversity receiver, a radio signal is received as a received signal sequence by a diversity branch 31. The received signal sequence is supplied as an input signal to a sampler 32. The sampler 32 is for sampling the input signal in accordance with pulses which are produced in an oscillator 33 to have a particular rate equal to twice a predetermined symbol rate. Therefore, the input signal is sampled at the particular rate upon the sampling timing and is supplied as a sampled serial signal sequence to a converting circuit 34. The sampled serial signal sequence is made of sampled signals which are produced dependent on the sampling timing and have a slight time lag therebetween.

The converting circuit 34 converts the sampled serial signal sequence into a first and a second parallel signal. The first parallel signal is dependent on first ones of the sampled serials. The second parallel signal is dependent on second ones of the sampled signals.

The first parallel signal is supplied to a first channel impulse response estimation circuit 36 and a first branch metric calculation circuit 37. The second parallel signal is supplied to a first channel impulse response estimation circuit 38 and a second branch metric calculation circuit 39.

Supplied with the first and the second parallel signals, the first and the second channel impulse response estimation circuits 36 and 38 estimate channel impulse responses for the input signal to produce a first and a second estimation result which are supplied to the first and the second branch metric calculation circuits 37 and 39, respectively. The first and the second branch metric calculation circuits 37 and 39 calculate a first and a second branch metrics with reference to the first and the second parallel signals and the first and the second estimation results, respectively, and supplies the first and the second branch metrics to a branch metric combining circuit 41. The branch metric combining circuit 41 combines the first and the second branch metrics to each other to produce a combined branch metric which is supplied to a Viterbi processor 42.

In the second conventional diversity receiver, such deterioration dependent upon the sample timing is suppressed. However, reception characteristics can not be improved against fading such that the reception level drops down.

Figure 3:
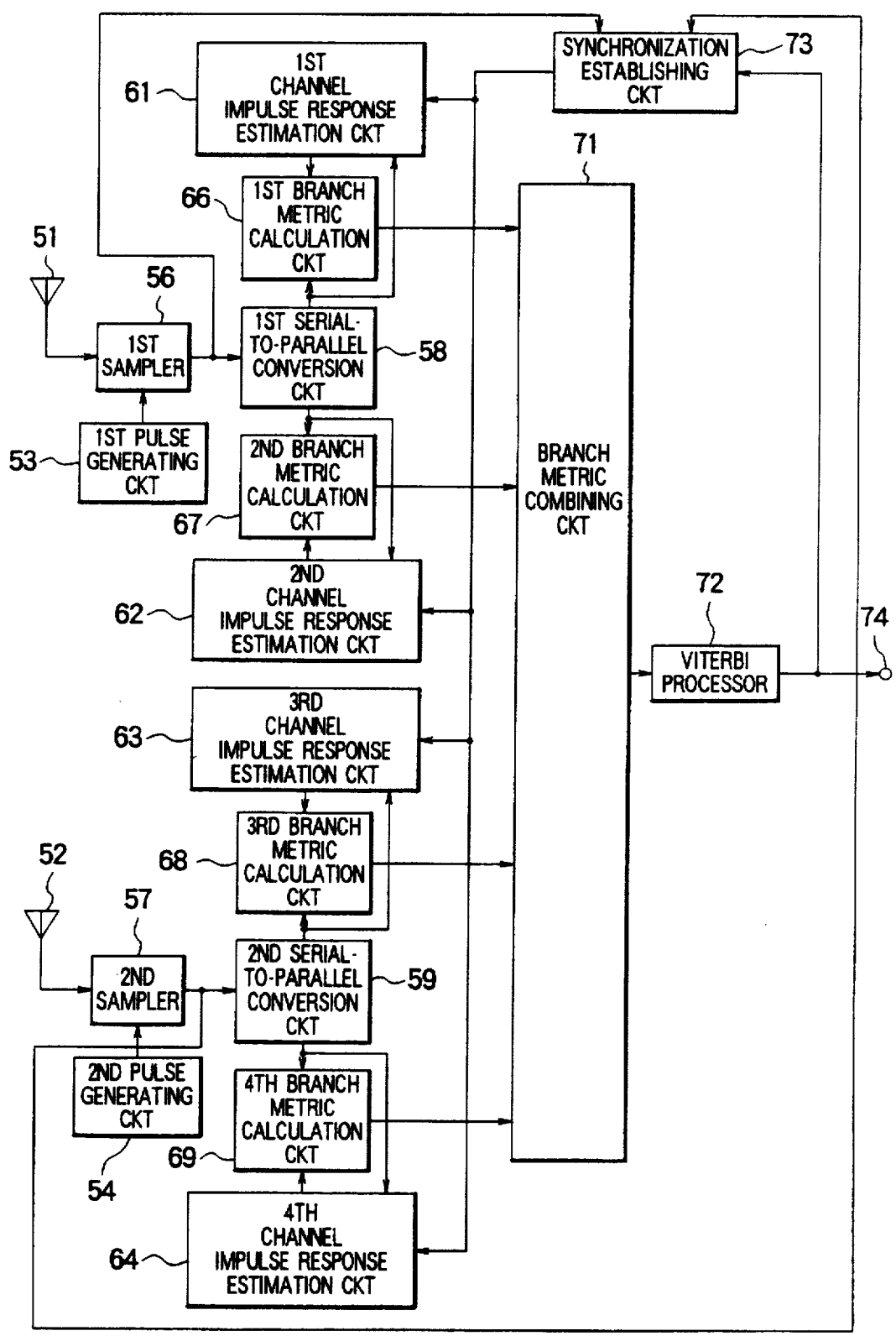
FIG. 3 is a block diagram of a diversity receiver according to a first embodiment of this invention.

Referring to FIG. 3, the description will be made in detail as regards a diversity receiver according to a first embodiment of this invention. The diversity receiver includes first and second diversity branches 51 and 52 which are placed with a distance therebetween. Each of the first and the second diversity branches 51 and 52 is for receiving a radio signal to produce a first and a second received signal sequence. In the manner which will later be described, each of the first and the second received signal sequences is sampled at a particular rate equal to twice a symbol rate known in the art.

In the manner which will presently be described, the diversity receiver further comprises first and second pulse generating circuits 53 and 54, first and second samplers 56 and 57, first and second serial-to-parallel conversion circuits 58 and 59, first, second, third, and fourth channel impulse response estimation circuits 61, 62, 63, and 64, first, second, third, and fourth branch metric calculation circuits 66, 67, 68, and 69, a branch metric combining circuit 71, a Viterbi processor 72, and a synchronization establishing circuit 73.

The first and the second pulse generating circuits 53 and 54 are for generating first pulses and second pulses each having the particular rate and being representative of sample timing. The first sampler 56 is connected to the first diversity branch 51 and the first pulse generating circuit 53 and is for sampling the first received signal sequence in accordance with the sample timing of the first pulses to produce a first sampled serial signal sequence. The second sampler 57 is connected to the second diversity branch 52 and the second pulse generating circuit 54 and is for sampling the second received signal sequence in accordance with the sample timing of the second pulses to produced a second sampled serial signal sequence. Each of the first and the second sampled serial signal sequence is made of sampled signals which are produced dependent on the sampling timing and have a slight time lag therebetween.

The first serial-to-parallel conversion circuit 58 is connected to the first sampler 56 and is for carrying out a serial-to-parallel conversion as regards the first sampled serial signal sequence to produce a first and a second parallel signal. The second serial-to-parallel conversion circuit 59 is connected to the second sampler 57 and is for carrying out the serial-to-parallel conversion as regards the second sampled serial signal sequence to produce a third and a fourth parallel signal. The first parallel signal is dependent on first ones of the sampled signals of the first sampled serial signal sequence. The second parallel signal is dependent on second ones of the sampled signals of the first sampled serial signal sequence. The third parallel signal is dependent on first ones of the sampled signals of the second sampled serial signal sequence. The fourth parallel signal is dependent on second ones of the sampled signals of the second sampled serial signal sequence.

The first channel impulse response estimation circuit 61 is connected to the first serial-to-parallel conversion circuit 58 and the synchronization establishing circuit 73 and is for estimating channel impulse response for the first received signal sequence with reference to the first parallel signal and a synchronizing signal to produce a first estimated impulse response signal. In this connection, the synchronizing signal is supplied from the synchronization establishing circuit 73. The second channel impulse response estimation circuit 62 is connected to the first serial-to-parallel conversion circuit 58 and the synchronization establishing circuit 73 and is for estimating the channel impulse response for the first received signal sequence with reference to the second parallel signal and the synchronizing signal to produce a second estimated impulse response signal. The third channel impulse response estimation circuit 63 is connected to the second serial-to-parallel conversion circuit 59 and the synchronization establishing circuit 74 and is for estimating the channel impulse response for the second received signal sequence with reference to the third parallel signal and the synchronizing signal to produce a third estimated impulse response signal. The fourth channel impulse response estimation circuit 64 is connected to the second serial-to-parallel conversion circuit 59 and the synchronization establishing circuit 74 and is for estimating the channel impulse response for the second received signal sequence with reference to the fourth parallel signal and the synchronizing signal to produce a fourth estimated impulse response signal. Each of the first through the fourth channel impulse response estimation circuits 61 to 64 can be implemented by the use of a transversal filter as disclosed in "Digital Communications" written by Proakis and published by McGraw-Hill, 1983, Section 6, FIG. 6.7.5.

The first branch metric calculation circuit 66 is connected to the first channel impulse response estimation circuit 61 and is for calculating a first branch metric for the first received signal sequence in response to the first estimated impulse response signal to produce a first branch metric signal representative of the first branch metric. The second branch metric calculation circuit 67 is connected to the second channel impulse response estimation circuit 62 and is for calculating a second branch metric for the first received signal sequence in response to the second estimated impulse response signal to produce a second branch metric signal representative of the second branch metric. The third branch metric calculation circuit 68 is connected to the third channel impulse response estimation circuit 63 and is for calculating a third branch metric for the second received signal sequence in response to the third estimated impulse response signal to produce a third branch metric signal representative of the third branch metric. The fourth branch metric calculation circuit 69 is connected to the fourth channel impulse response estimation circuit 64 and is for calculating a fourth branch metric for the second received signal sequence in response to the fourth estimated impulse response signal to produce a fourth branch metric signal representative of the fourth branch metric. Each of the first through the fourth branch metrics can be calculated as disclosed in "Digital Communications" written by Proakis and published by McGraw-Hill, 1983, Section 6, Equations (6.7.1) and (6.7.2), the second terms in the right sides.

The branch metric combining circuit 71 is connected to the first through the fourth branch metric calculation circuits 64 to 69 and is for combining the first through the fourth branch metrics to one another in response to the first through the fourth branch metric signals to produce a combined branch metric. The Viterbi processor 72 is connected to the branch metric combining circuit 71 and is for carrying out maximum likelihood sequence estimation in accordance with the combined branch metric to produce a decision signal which is supplied to the synchronization establishing circuit 73 and an output terminal 74. The synchronization establishing circuit 73 is connected to the first and the second samplers 56 and 57, the first through the fourth channel impulse response estimation circuits 61 to 64, and the Viterbi processor 72 and is for producing the synchronizing signal in response to the first and the second sampled signal sequences, the first through the fourth estimated impulse response signals, and the decision signal.

Figure 4:
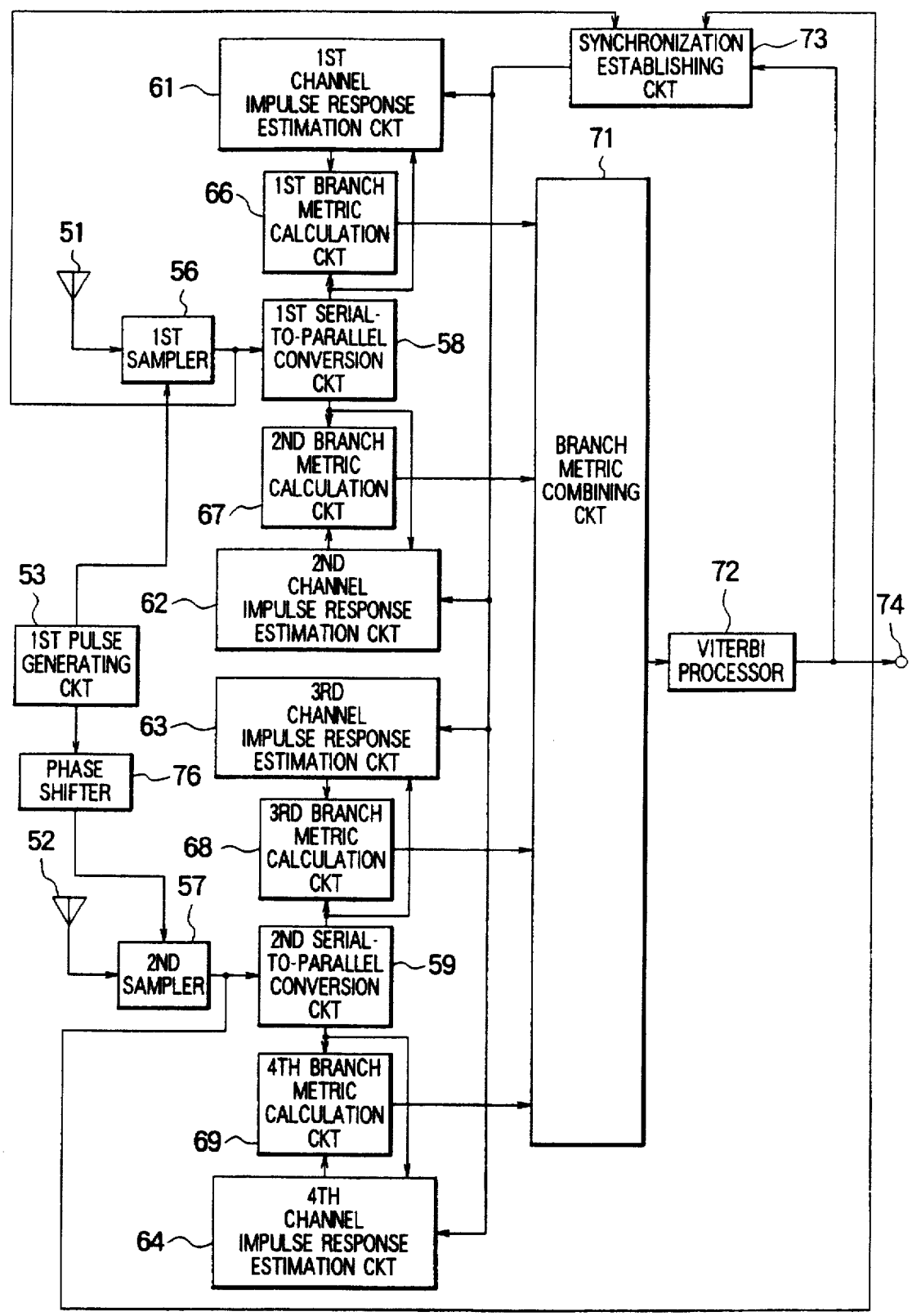
FIG. 4 is a block diagram of a diversity receiver according to a second embodiment of this invention.

Turning to FIG. 4, the description will be made as regards a diversity receiver according to a second embodiment of this invention. Similar parts are designated by like reference numerals.

The diversity receiver comprises a phase shifter 76 instead of the second pulse generating circuit 54 illustrated in FIG. 3. The phase shifter 76 is connected to the first pulse generating circuit 53 and the second sampler 57 and is for phase-shifting the first pulses that are generated in the first generating circuit 53 and have the rate equal to twice the symbol rate. The phase shifter 76 produces phase-shifted pulses and supplies the phase-shifted pulses instead of the above-mentioned second pulses to the second sampler 57.

Although the description is made as regards a case where the diversity receiver has two diversity branches, the diversity receiver may be designed to have three or more diversity branches. In the latter case, it is a matter of course that the diversity receiver includes six or more branch metric calculation circuits each of which is similar to each of the first through the fourth branch metric calculation circuits 66 to 69.

Taking the latter case into consideration, the description will be proceeded.

In each of the diversity receivers illustrated in FIGS. 3 and 4, let the number of constellation signal points be represented by I, where I is a positive integer not smaller than two. The number of symbols giving intersymbol interference to be considered is represented by M, where M is a positive integer. In this event, the number of states in the Viterbi processor 72 is equal to $I^M$ and the number of branches is equal to $I^{M+1}$. The branch metric combining circuit 71 is supplied from each of the first through the fourth branch metric calculation circuits 66 to 69 with $I^{M+1}$ values equal in number to the branches $I^{M+1}$ as the branch metrics for one symbol transmission. Responsive to the $I^{M+1}$ values, the branch metric combining circuit 71 adds or combines the values of each corresponding branch to produce combined values, $I^{M+1}$ in number, as the combined branch metric.

Figure 5:
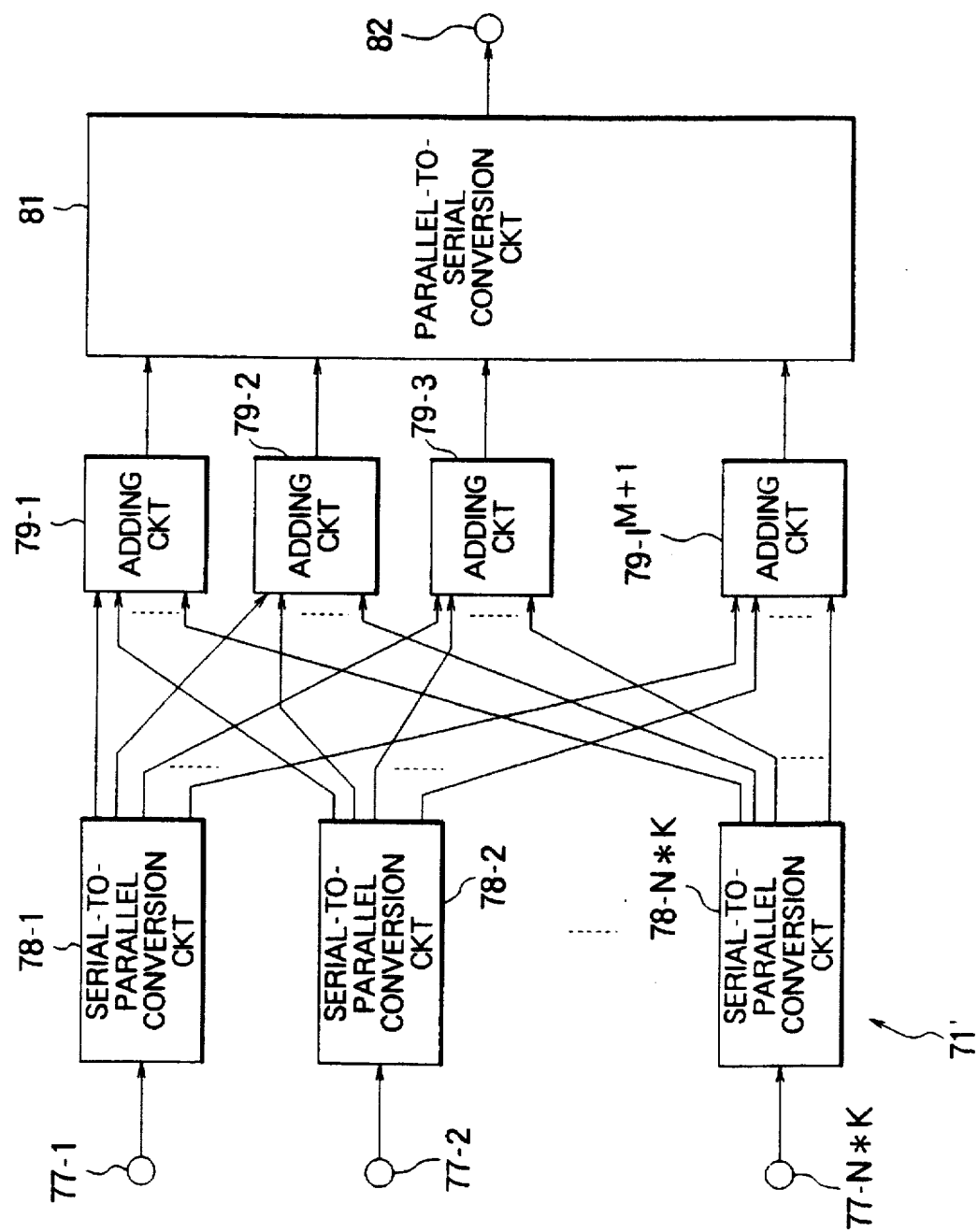
FIG. 5 is a block diagram of a first example of a branch metric combining circuit included in a diversity receiver according to another embodiment of this invention.

A first example of such a branch metric combining circuit is illustrated in FIG. 5. The branch metric combining circuit 71' is designed on condition that the diversity receiver comprises diversity branches, K in number where K is a positive integer not smaller than two, that sampling is carried out at a rate equal to N times the symbol rate where N is a positive integer not smaller than two, that the number of multivalues of the transmission signal is represented by I, and that the number of symbols giving intersymbol interference to be considered is represented by M. In the manner which will presently be described, the branch metric combining circuit 71' comprises input terminals 77-1 to 77-N*K, serial-to-parallel conversion circuits 78-1 to 78-N*K, adding circuits 79-1 to 79-$I^{M+1}$, a parallel-to-serial conversion circuit 81, and an output terminal 82.

Each of the input terminals 77-1 to 77-N*K is for receiving branch metric signals with the branch metric consisting of $I^{M+1}$ values in a serial fashion. Each of the branch metric signals is similar to each of the first through the fourth branch metric signals that is described in conjunction with FIGS. 3 and 4. The serial-to-parallel conversion circuits 78-1 to 78-N*K are connected to the input terminals 77-1 to 77-N*K, respectively. Each of the serial-to-parallel conversion circuits 78-1 to 78-N*K is for converting each of the branch metrics into parallel values, $I^{M+1}$ in number, to supply the parallel values to the adding circuits 79-1 to 79-$I^{M+1}$, respectively. Each of the adding circuits 79-1 to 79-$I^{M+1}$ is connected to the serial-to-parallel conversion circuits 78-1 to 78-N*K and for adding and combining the parallel values that are supplied from the serial-to-parallel conversion circuits 78-1 to 78-N*K, respectively. The adding circuits 79-1 to 79-$I^{M+1}$ produce $I^{M+1}$ added values as the branch metrics. The parallel-to-serial conversion circuit 81 is connected to the adding circuits 79-1 to 79-$I^{M+1}$ and is for converting the $I^{M+1}$ added value into the combined branch metric in a serial form. The combined branch metric is supplied through the output terminal 82 to the Viterbi processor 72 that is illustrated in FIGS. 3 and 4. The adding circuits 79-1 to 79-$I^{M+1}$ may supply the $I^{M+1}$ added values directly to the Viterbi processor 72 in a case where the Viterbi processor 72 is designed to process a signal of a parallel form.

Returning back to FIGS. 3 and 4, the description will be proceeded. The branch metric has such a characteristic that the difference in likelihood becomes greater with an increase of the difference between the maximum value and the minimum value of the $I^{M+1}$ values. It is believed that the likelihood to the symbol has a higher reliability as the difference in likelihood increases. Utilizing this characteristic, calculation is made of the difference between the maximum value and the minimum value of the $I^{M+1}$ values from each of the first through fourth branch metric calculation circuits 66 to 69. A greater weighting factor is given to the input from of the first through fourth branch metric calculation circuits 66 to 69 that produces the branch metric exhibiting a greater difference. On the other hand, a smaller weighting factor is given to the input from one of the first through the fourth branch metric calculation circuits 66 to 69 that produces the branch metric exhibiting a smaller difference. Combination is then carried out. Thus, it is possible to obtain the combined branch metric with a high reliability.

Figure 6:
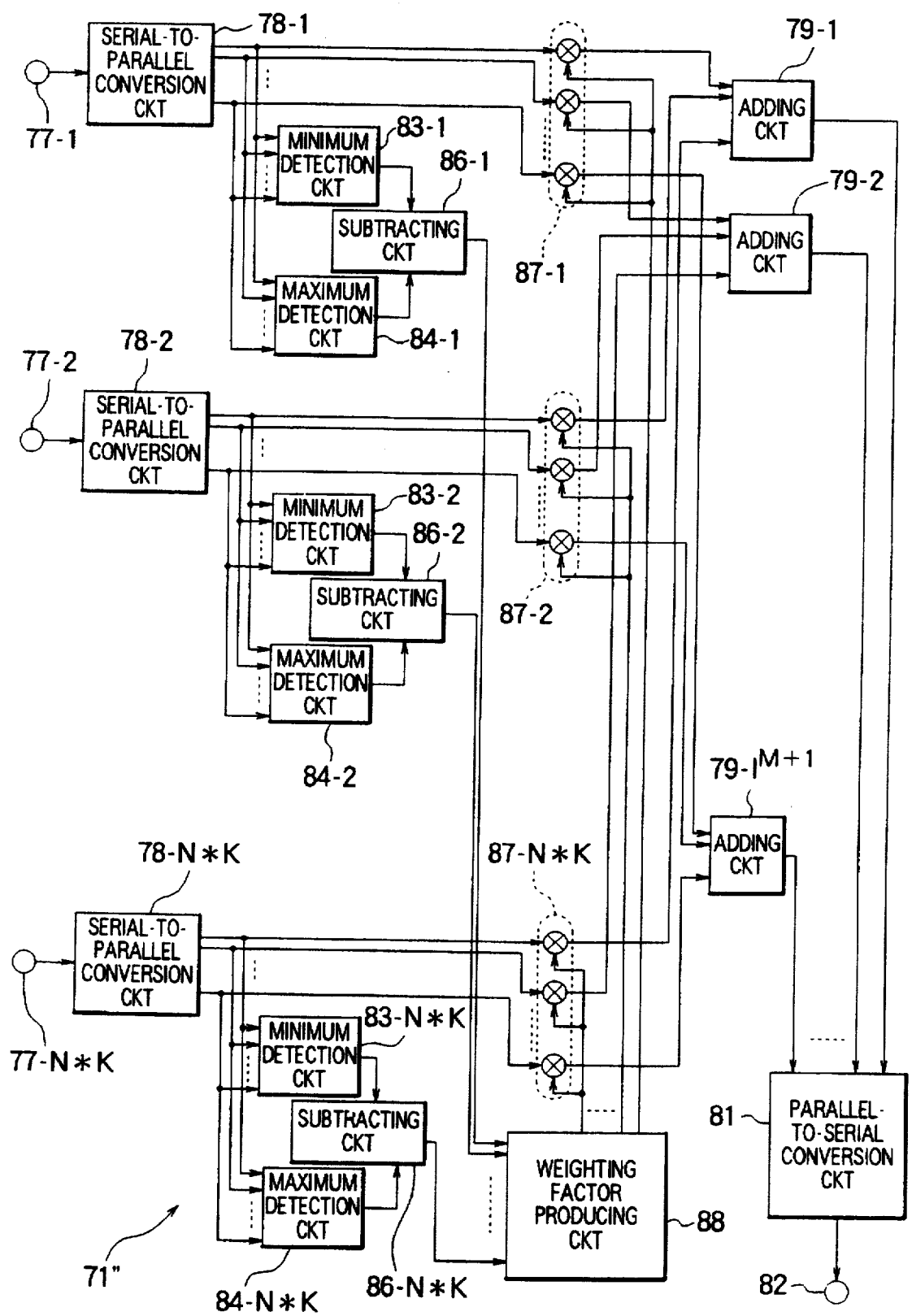
FIG. 6 is a block diagram of a second example of a branch metric combining circuit which can be included in the diversity receiver according to still another embodiment of this invention.

Referring to FIG. 6, the description will be directed to a second example of the branch metric combining circuit. The branch metric combining circuit 71" is designed on condition that the diversity receiver comprises diversity branches, K in number, that sampling is carried out at a rate equal to N times the symbol rate, that the number of multivalues of the transmission signal is represented by I, and that the number of symbols giving intersymbol interference to be considered is represented by M. The branch metric combining circuit 71" comprises similar parts designated by like reference numerals.

M The branch metric combining circuit 71" further comprises minimum detection circuits 83-1 to 83-N*K, maximum detection circuits 84-1 to 84-N*K, subtracting circuits 86-1 to 86-N*K, multiplying circuits 87-1 to 87-N*K, and a weighting factor producing circuit 88. Each of the multiplying circuits 87-1 to 87-N*K comprises multipliers, $I^{M+1}$ in number. Each of the serial-to-parallel conversion circuits 78-1 to 78-N*K produces $I^{M+1}$ values which are supplied to each of the minimum detection circuits 83-1 to 83-N*K and to each of the maximum detection circuits 84-1 to 84-N*K. Each of the minimum detection circuits 83-1 to 83-N*K calculates a minimum value of the $I^{M+1}$ values and supplies the minimum value to each of the subtracting circuits 86-1 to 86-N*K. Each of the maximum detection circuits 84-1 to 84-N*K calculates a minimum value of the $I^{M+1}$ values and supplies the minimum value to each of the subtracting circuits 86-1 to 86-N*K. Each of the subtracting circuits 86-1 to 86-N*K calculates a difference between the maximum value and the minimum value to produce a difference signal representative of the difference. The difference signal is supplied to the weighting factor producing circuit 88.

Returning back to FIGS. 3 and 4 shortly, the description will be made as regards a relationship between the branch metric and the likelihood. The first through the fourth branch metric calculation circuits 66 to 69 may have either a structure such that the likelihood is higher as the branch metric is greater or another structure such that the likelihood is higher as the branch metric is smaller. In each of FIGS. 3 and 4, the first through the fourth branch metric calculation circuits 66 to 69 have the structure such that the likelihood is higher as the branch metric is greater.

Referring to FIG. 6 again, the description will be proceeded. In the manner which will later be described, the weighting factor producing circuit 88 is for producing a weighting factor which is supplied to each of the multiplying circuits 87-1 to 87-N*K particularly to the multipliers. Responsive to the difference signal, the weighting factor producing circuit 88 judges that the reliability of likelihood is higher when the difference is greater. In this case, the factor is determined to have a greater value for the output from one of the serial-to-parallel conversion circuits 78-1 to 78-N*K.

Figure 7:
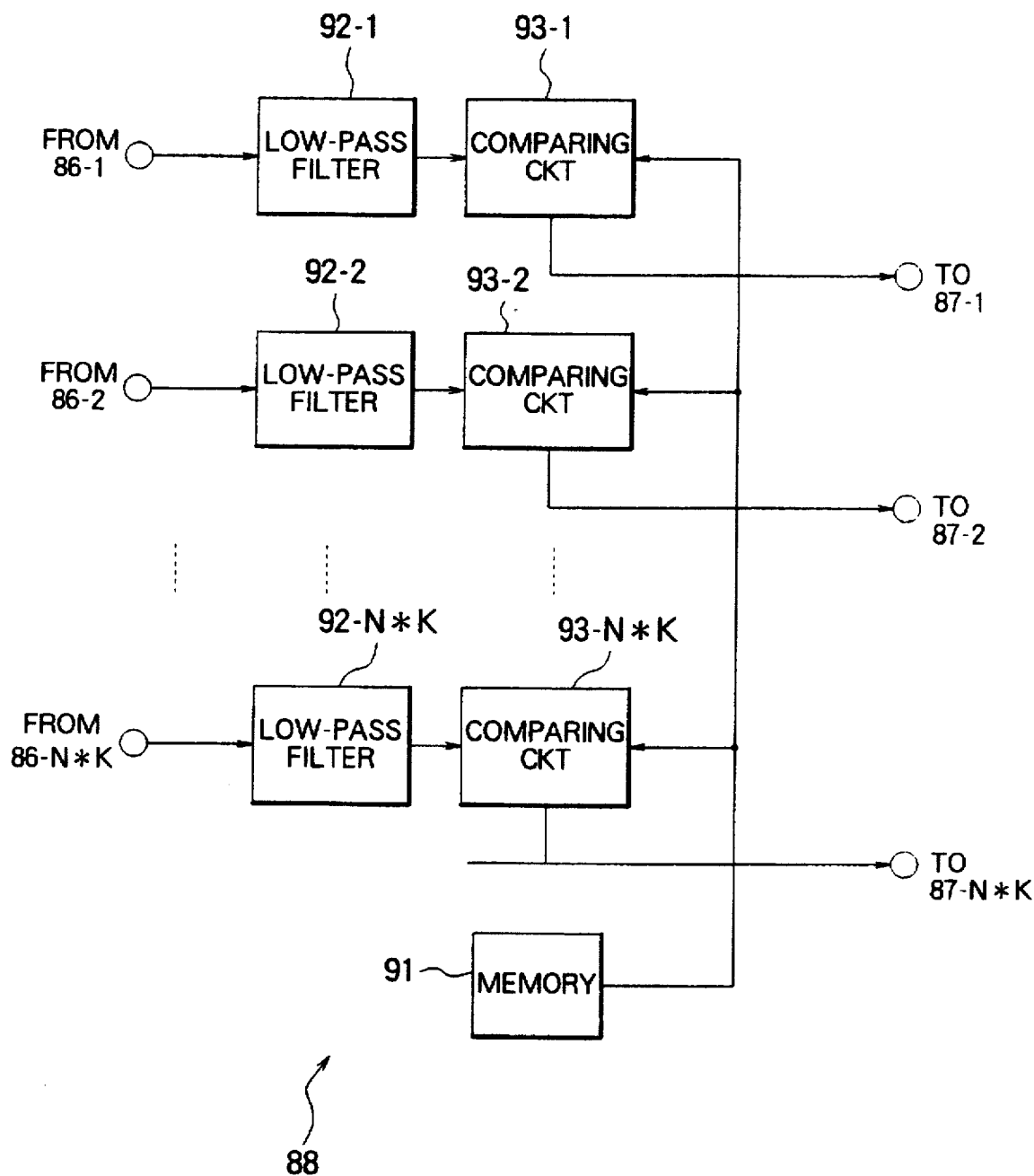
FIG. 7 is a block diagram of a weighting factor producing circuit included in the branch metric combining circuit illustrated in FIG. 6.

Referring to FIG. 7, the description will be directed to the weighting factor producing circuit 88. In the manner which will presently be described, the weighting factor producing circuit 88 comprises a memory 91, low-pass filters 92-1 to 92-N*K, and comparing circuits 93-1 to 93-N*K. The memory 91 is for memorizing a threshold value. The difference signal is supplied to each of the low-pass filters 92-1 to 92-N*K from each of the subtracting circuits 86-1 to 86-N*K and is averaged by each of the low-pass filters 92-1 to 92-N*K. The low-pass filters 92-1 to 92-N*K produce filter outputs which are supplied to the comparing circuits 92-1, respectively. Each of the comparing circuits 93-1 to 93-N*K is for carrying out a comparison between each of the filter outputs and the threshold value. When each of the filter outputs is greater than the threshold value, each of the comparing circuits 93-1 to 93-N*K produces a logic "1" and supplies the logic "1" as the weighting factor to each of the the multiplying circuits 87-1 to 87-N*K. When each of the filter outputs is smaller than the threshold value, each of the comparing circuits 93-1 to 93-N*K produces a logic "0" and supplies the logic "0" as the weighting factor to each of the the multiplying circuits 87-1 to 87-N*K. It is possible to make the weighting factor producing circuit 88 produce multilevel weighing factors although the description is made as regards a case where the weighting factor producing circuit 88 produces one of the logics "1" and "0".

Figure 8:
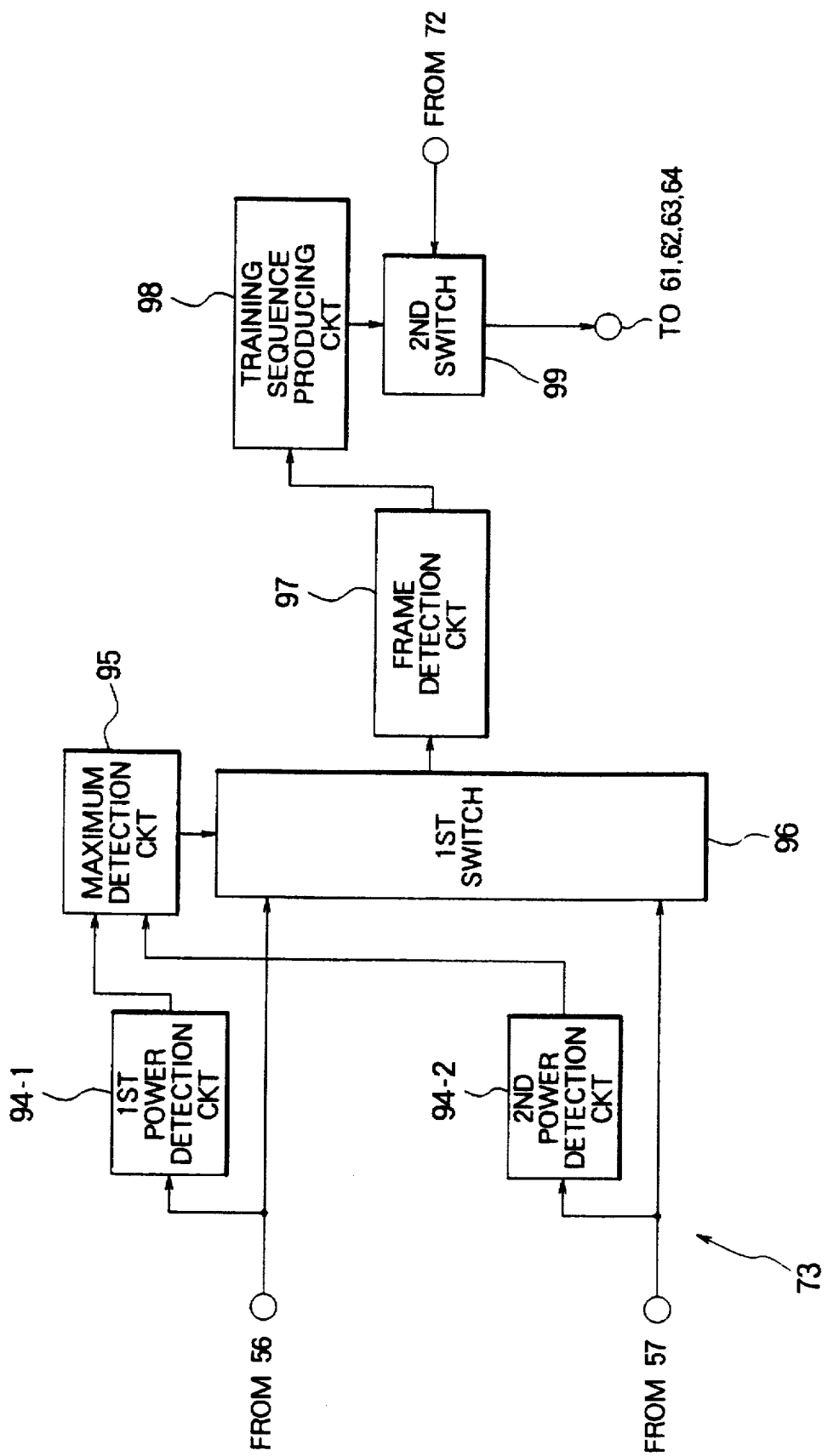
FIG. 8 is a block diagram of a synchronization establishing circuit included in each of the diversity receivers illustrated in FIGS. 3 and 4.

Referring to FIG. 8, the description will be directed to the synchronization establishing circuit 73 that is included in each of the diversity receivers of FIGS. 3 and 4. In the manner which will presently be described, the synchronization establishing circuit 73 comprises first and second power detection circuits 94-1 and 94-2, a maximum detection circuit 95, a first switch 96, a frame detection circuit 97, a training sequence producing circuit 98, and a second switch 99.

The first and the second power detection circuits 94-1 and 94-2 are supplied with the first and the second sampled serial signal sequences from the first and the second samplers 56 and 57 respectively. Responsive to the first sampled serial signal sequence, the first power detection circuit 94-1 detects a first electric power value which is dependent on intensity of the first received signal sequence in the first diversity branch 51 of each of FIGS. 3 and 4. Responsive to the second sampled serial signal sequence, the second power detection circuit 94-2 detects a second electric power value which is dependent on intensity of the second received signal sequence in the second diversity branch 51 of each of FIGS. 3 and 4.

The maximum detection circuit 95 is connected to the first and the second power detection circuits 94-1 and 94-2 and is for detecting, as a maximum value, one of the first and the second electric power values to produce a selection control signal with reference to the maximum value. The first switch 96 is connected to the first and the second samplers 56 and 57 and the maximum detection circuit 95 and is for selecting, as a selected signal sequence, one of the first and the second sampled serial signal sequences with reference to selection control signal. The frame detection circuit 97 is connected to the first switch 96 and is for detecting frame synchronization of the selected signal sequence to produce an output control signal in accordance with the frame synchronization. The training sequence producing circuit 98 is connected to the frame detection circuit 97 and is for producing a predetermined training sequence in response to the output control signal.

The second switch 99 is connected to the training sequence producing circuit 98 and the Viterbi processor 72 and is supplied with the predetermined training sequence from the training sequence producing circuit 98 and with the decision signal from the Viterbi processor 72. Supplied with the predetermined training sequence, the second switch 99 supplies the predetermined training sequence to the first through fourth channel impulse response estimation circuits 61 to 64. The predetermined training sequence can be used to carry out initial setting of the first through fourth channel impulse response estimation circuits 61 to 64. When supply of the predetermined training sequence becomes an end thereof, the second switch 99 supplies the decision signal to the the first through fourth channel impulse response estimation circuits 61 to 64. Thus, it is possible to supply the decision signal to all of the diversity branches, namely, the first through fourth channel impulse response estimation circuits 61 to 64 at the same timing and to coincide synchronization between these diversity branches.

While the present invention has far been described in connection with a few embodiments thereof, it will readily be possible for those skilled in the art to put this invention into practice in various other manners. For example, the present invention is applicable to any diversity receiver having K diversity branches and K samplers for sampling input signals from the respective diversity branches. The diversity receiver can be implemented by software when a digital signal processor is used. The diversity receiver may be provided with a particular memory which is for temporarily memorizing each of the first and the second sampled serial signal sequences. The first through the fourth channel impulse response estimation circuits may simultaneously produce channel impulse response estimation process information, as shown in FIG. 8 of the maximum likelihood sequence estimation device disclosed in the above-referenced Japanese Unexamined Patent Publication No. 152975/1993. In this case, the branch metric combining circuit is implemented by supplying with the channel impulse response estimation process information to the weighting factor producing circuit.

What is claimed is:

1. A diversity receiver for receiving a radio signal to produce a receiver output, said radio signal having a symbol rate, comprising:

a plurality of diversity branches having a predetermined distance therebetween, each of said diversity branches producing a received signal sequence in response to reception of said radio signal;

a plurality of branch metric producing circuits connected to said diversity branches, respectively, for producing a plurality of branch metrics by the use of said received signal sequence;

a branch metric combining circuit connected to said branch metric producing circuits for combining said branch metrics to one another to produce a combined branch metric; and a Viterbi processor connected to said branch metric combining circuit for carrying out maximum likelihood sequence estimation in accordance with the combined branch metric to produce a decision signal as said receiver output, each of said branch metric producing circuits comprising:

a sampler connected to one of said diversity branches for sampling said received signal sequence with plural times of said symbol rate to produce a sampled serial signal sequence;

a serial-to-parallel conversion circuit connected to said sampler for converting said sampled serial signal sequence into a plurality of parallel signals;

a plurality of channel impulse response estimation circuits connected to said serial-to-parallel conversion circuit for estimating channel impulse responses with reference to said parallel signals to produce a plurality of estimated impulse response signals; and a plurality of branch metric calculation circuits connected to said channel impulse response estimation circuits, respectively, and to said serial-to-parallel conversion circuits each for calculating each of said branch metrics in accordance with each of said estimated impulse response signals and with each of said parallel signals to supply each of said branch metrics to said branch metric combining circuit.

2. A diversity receiver as claimed in claim 1, wherein each of said branch metric producing circuits further comprises a pulse generating circuit for generating pulses having a particular rate equal to said plural times of said symbol rate, said sampler being connected to said pulse generation circuit and sampling said received signal sequence in accordance with said pulses.

3. A diversity receiver as claimed in claim 1, further comprising a pulse generating circuit for generating pulses having a particular rate equal to said plural times of said symbol rate, each of said branch metric producing circuits further comprising a phase shifter connected to said pulse generating circuit for carrying out phase-shifting of said pulses to produce phase-shifted pulses, said sampler being connected to said phase shifter and sampling said received signal sequence in accordance with said phase-shifted pulses.

4. A diversity receiver as claimed in claim 1, further comprising a pulse generating circuit for generating pulses having a particular rate equal to said plural times of said symbol rate, a selected one of said branch metric producing circuits being connected to said pulse generating circuit and sampling said received signal sequence in accordance with said pulses, each of another ones of said branch metric producing circuits further comprising a phase shifter connected to said pulse generating circuit for carrying out phase-shifting of said pulses to produce phase-shifted pulses, said samples of each of the other ones of said branch metric producing circuits being connected to said phase shifter and sampling said received signal sequence in accordance with said phase-shifted pulses.

5. A diversity receiver comprising:
a Viterbi processor for carrying out maximum likelihood sequence estimation to produce a decision signal;
diversity branches, K in number, each for receiving a radio signal to produce a received signal sequence, where K is a positive integer not smaller than two;
pulse producing means for producing pulses having a particular rate equal to N times a symbol rate relating to said radio signal, where N is a positive integer not smaller than two;
samplers, K in number, connected to said diversity branches, respectively, and to said pulse producing means, each of said samplers being for sampling said received signal sequence in accordance with said pulses to produce a sampled serial signal sequence;
serial-to-parallel conversion circuits, K in number, connected to said samplers, respectively, each of said serial-to-parallel conversion circuits being for converting said sampled serial signal sequence into parallel signals, N in number;
channel impulse response estimation circuits, (N×K) in number, N in number of said channel impulse response estimation circuits being connected to each of said serial-to-parallel conversion circuits, said channel impulse response estimation circuits being for estimating channel impulse responses with reference to said parallel signals and to said decision signal to produce estimated impulse response signals;
branch metric calculation circuits, (N×K) in number, connected to said channel impulse response estimation circuits and said serial-to-parallel conversion circuits, respectively, N in number of said channel impulse response estimation circuits being connected to each of said serial-to-parallel conversion circuits, said branch metric calculation circuits being for calculating branch metric in accordance with said estimated impulse response signals and said parallel signals to produce branch metric signals each of which is representative of said branch metric; and
a branch metric combining circuit connected to said branch metric calculation circuits for combining said branch metric signals to produce a combined branch metric,
said Viterbi processor being connected to said branch metric combining circuit and carrying out said maximum likelihood sequence estimation in accordance with said combined branch metric to produce said decision signal.

6. A diversity receiver as claimed in claim 5, wherein said pulse producing means comprises pulse generating circuits, K in number, connected to said samplers, respectively, each of said pulse generating circuits being for generating said pulses to supply said pulses to said samplers.

7. A diversity receiver as claimed in claim 5, wherein said pulse producing means comprises:
a pulse generating circuit connected to a first one of said samplers for generating said pulses to supply said first one;
a phase-shifter connected to said pulse generating circuit for phase-shifting said pulses to produce phase-shifted pulses; and
means connected to said phase-shifter and a second one of said samplers for supplying said phase-shifted pulses as the first-mentioned pulses to said second one.

8. A diversity receiver as claimed in claim 5, further comprising a synchronization establishing circuit supplied with outputs of said samplers and with a decision signal for establishing synchronization among said diversity branches to produce a synchronized decision signal which is supplied as the first mentioned decision signal to said channel impulse response estimation circuits.

9. A diversity receiver as claimed in claim 5, wherein said branch metric combining circuit comprises:
serial-to-parallel conversion circuits, (N×K) in number, each of which is supplied from a corresponding one of said branch metric combining circuits with the branch metric for one symbol to be demodulated and divides the branch metric into branch metrics, $I^{M+1}$ in number, corresponding to state transitions, $I^{M+1}$ in number, respectively, where I represents the number of multivalues of the signal and is a positive integer not smaller than two and where M represents the number of symbols giving intersymbol interference to be considered and is a positive integer; and
adding circuits, $I^{M+1}$ in number, supplied with the outputs of said serial-to-parallel conversion circuits for adding and combining the branch metrics with respect to each of said state transitions.

10. A diversity receiver as claimed in claim 5, wherein said branch metric combining circuit comprises, where I represents the number of multivalues of the signal and I is a positive integer not smaller than two and where M represents the number of symbols giving intersymbol interference to be considered and is a positive integer:
serial-to-parallel conversion circuits, (N×K) in number, each of which is supplied from a corresponding one of said branch metric combining circuits with the branch metric for one symbol to be demodulated and divides the branch metric into branch metrics, $I^{M+1}$ in number, corresponding to state transitions, $I^{M+1}$ in number, respectively;

minimum detection circuits, (N×K) in number, each of which is supplied as input signals with the branch metrics obtained by each corresponding one of said serial-to-parallel conversion circuits and detects a minimum value among said input signals;

maximum detection circuits, (N×K) in number, each of which is supplied as input signals with the branch metrics obtained by each corresponding one of said serial-to-parallel conversion circuits and detects a maximum value among said input signals;

subtracting circuits, (N×K) in number, each of which is supplied as input signals with outputs of one of said minimum detection circuits and one of said maximum detection circuits, said ones being connected in common to a corresponding one of said serial-to-parallel conversion circuits, and produces an output representative of a difference between said input signals as branch metric reliability information;

a weighting factor producing circuit supplied with the outputs of said subtracting circuits for calculating a weighting factor for each of said serial-to-parallel conversion circuits to produce a plurality of weighting factors, (N×K) in number;

multiplying circuits ($I^{M+1}$×N×K) in number, for multiplying the outputs produced by each of said serial-to-parallel conversion circuits and a corresponding one of the weighting factors obtained by said weighting factor producing circuit; and adding circuit, $I^{M+1}$ in number, supplied with outputs of said multiplying circuits for adding and combining the outputs to produce a branch metric for each of said state transitions.

11. A diversity receiver as claimed in claim 10, wherein each of said weighting factor producing circuit comprises:

low-pass filters, (N×K) in number, supplied with said branch metric reliability information for averaging the input signals;

a memory for memorizing a predetermined threshold value; and comparing circuits, (N×K) in number, supplied with outputs of said low-pass filters and said threshold value for producing weighting factors for the outputs of said low-pass filters with reference to said threshold value and the outputs of said low-pass filters.

12. A diversity receiver as claimed in claim 5, wherein said synchronization establishing circuit comprises:

power detecting circuits, K in number, supplied with the outputs of said samplers;

a maximum detection circuit supplied with outputs of said power detecting circuits for obtaining a maximum value to produce a selection control signal representative of one of said power detecting circuits that supplies a maximum electric power;

a first switch supplied with said selection control signal and the outputs of said samplers for selecting, with reference to said selection control signal, one of the outputs of said samplers that has a maximum electric power to produce a selection output signal;

a frame detecting circuit supplied with said selection output signal from said first switch for producing a frame detection control signal when a frame to be demodulated is detected;

a training sequence producing circuit responsive to said frame detection control signal for producing a training sequence start signal, then producing a predetermined training sequence, and producing a training sequence end signal upon completion of production of said training sequence; and a second switch supplied with the signals from said training sequence producing circuit and with the decision signal from said Viterbi processor, said second switch outputting, in response to said training sequence start signal, the training sequence from said training sequence producing circuit until said training sequence end signal is detected, said second switch outputting said decision signal as said synchronized decision signal after said training sequence end signal is detected.

\* \* \* \* \*